US008646770B2

(12) United States Patent
Meier et al.

(10) Patent No.: US 8,646,770 B2
(45) Date of Patent: Feb. 11, 2014

(54) CARD SUBSTRATE ROTATOR WITH LIFT MECHANISM

(75) Inventors: James R. Meier, Minneapolis, MN (US); John P. Skoglund, Minneapolis, MN (US); Anthony L. Lokken, Golden Valley, MN (US)

(73) Assignee: HID Global Corporation, Irvine, CA (US)

(*) Notice: Subject to any disclaimer, the term of this patent is extended or adjusted under 35 U.S.C. 154(b) by 137 days.

(21) Appl. No.: 13/496,406

(22) PCT Filed: Sep. 17, 2010

(86) PCT No.: PCT/US2010/049268
§ 371 (c)(1),
(2), (4) Date: Mar. 15, 2012

(87) PCT Pub. No.: WO2011/035114
PCT Pub. Date: Mar. 24, 2011

(65) Prior Publication Data
US 2012/0177474 A1    Jul. 12, 2012

Related U.S. Application Data

(60) Provisional application No. 61/243,608, filed on Sep. 18, 2009.

(51) Int. Cl.
*B65H 29/22* (2006.01)
(52) U.S. Cl.
CPC ............ *B65H 29/22* (2013.01); *Y10S 271/902* (2013.01)
USPC ........... 271/81; 271/3.19; 271/3.24; 271/163; 271/186; 271/225; 271/272; 271/902

(58) Field of Classification Search
USPC .......... 271/3.19, 3.2, 3.24, 225, 272, 163, 72, 271/184–187, 81, 83, 902
See application file for complete search history.

(56) References Cited

U.S. PATENT DOCUMENTS

| 1,429,327 | A | * | 9/1922 | Daniell ...................... 271/186 |
| 3,598,396 | A | | 8/1971 | Andrews et al. |
| 3,755,653 | A | | 8/1973 | Venker |
| 3,889,472 | A | | 6/1975 | Guillaud |

(Continued)

FOREIGN PATENT DOCUMENTS

| DE | 2535699 A1 | 3/1977 |
| EP | 0431172 A1 | 6/1991 |

(Continued)

OTHER PUBLICATIONS

International Search Report and Written Opinion of International Application No. PCT/US05/31861, filed Sep. 8, 2005.

(Continued)

*Primary Examiner* — Gerald McClain
(74) *Attorney, Agent, or Firm* — Westman, Champlin & Koehler, P.A.

(57) ABSTRACT

A card substrate rotator comprises a substrate support, a rotator mechanism and a lift mechanism. The substrate support is configured to receive a card substrate and comprises a feed roller. The rotator mechanism is configured to rotate the substrate support about an axis. The lift mechanism is configured to move the substrate support and the axis in a vertical plane.

20 Claims, 15 Drawing Sheets

(56) References Cited

U.S. PATENT DOCUMENTS

| | | |
|---|---|---|
| 3,889,795 A | 6/1975 | Garberi et al. |
| 3,899,065 A | 8/1975 | Brignole |
| 3,960,072 A | 6/1976 | Ahlgren et al. |
| 4,015,839 A | 4/1977 | McKee |
| 4,017,068 A | 4/1977 | McKee |
| 4,031,518 A | 6/1977 | Holloran et al. |
| 4,068,028 A | 1/1978 | Samonides |
| 4,102,267 A | 7/1978 | Ritzerfeld |
| 4,146,900 A | 3/1979 | Arnold |
| 4,161,312 A | 7/1979 | Eckhardt et al. |
| 4,350,453 A | 9/1982 | Field et al. |
| 4,350,454 A | 9/1982 | Schoenlein |
| 4,393,386 A | 7/1983 | Di Giulio |
| 4,471,885 A | 9/1984 | Mucciarone |
| 4,534,313 A | 8/1985 | Louvel |
| 4,604,631 A | 8/1986 | Jinnai et al. |
| 4,673,304 A | 6/1987 | Liu et al. |
| 4,676,678 A | 6/1987 | Watanabe |
| 4,680,596 A | 7/1987 | Logan |
| 4,685,702 A | 8/1987 | Kazuharu |
| 4,686,540 A | 8/1987 | Leslie et al. |
| 4,687,358 A | 8/1987 | Saitou |
| 4,716,346 A | 12/1987 | Matsuo |
| 4,733,980 A | 3/1988 | Tosa |
| 4,734,868 A | 3/1988 | DeLacy |
| 4,781,985 A | 11/1988 | Desjarlais |
| 4,782,363 A | 11/1988 | Britt et al. |
| 4,797,018 A | 1/1989 | Hofmann et al. |
| 4,845,490 A | 7/1989 | Ward et al. |
| 4,848,941 A | 7/1989 | Imaseki |
| 4,961,088 A | 10/1990 | Gilliland et al. |
| 5,019,839 A | 5/1991 | Watanabe et al. |
| 5,037,216 A | 8/1991 | Nubson et al. |
| 5,077,467 A | 12/1991 | Barron, Jr. et al. |
| 5,079,565 A | 1/1992 | Shimizu et al. |
| 5,111,239 A | 5/1992 | Kamimura et al. |
| 5,128,763 A | 7/1992 | Sakuragi |
| 5,138,344 A | 8/1992 | Ujita |
| 5,149,211 A | 9/1992 | Pettigrew et al. |
| 5,150,174 A | 9/1992 | Ryczek et al. |
| 5,184,181 A | 2/1993 | Kurando et al. |
| 5,239,926 A | 8/1993 | Nubson et al. |
| 5,266,781 A | 11/1993 | Warwick et al. |
| 5,266,968 A | 11/1993 | Stephenson |
| 5,267,800 A | 12/1993 | Petteruti et al. |
| 5,277,501 A | 1/1994 | Tanaka et al. |
| 5,318,369 A | 6/1994 | Ishii |
| 5,318,370 A | 6/1994 | Nehowig |
| 5,326,179 A | 7/1994 | Fukai et al. |
| 5,327,201 A | 7/1994 | Coleman et al. |
| 5,368,677 A | 11/1994 | Ueda et al. |
| 5,405,055 A | 4/1995 | Hester |
| 5,455,617 A | 10/1995 | Stephenson et al. |
| 5,466,319 A | 11/1995 | Zager et al. |
| 5,502,464 A | 3/1996 | Takahashi et al. |
| 5,516,218 A | 5/1996 | Amano et al. |
| 5,530,468 A | 6/1996 | Yoshimi et al. |
| 5,558,449 A | 9/1996 | Morgavi |
| 5,642,877 A | 7/1997 | Green |
| 5,646,388 A | 7/1997 | D'Entremont et al. |
| 5,694,849 A | 12/1997 | Wehle et al. |
| 5,695,589 A | 12/1997 | German et al. |
| 5,703,347 A | 12/1997 | Reddersen et al. |
| 5,707,162 A | 1/1998 | Kasai et al. |
| 5,709,484 A | 1/1998 | Dorner |
| 5,709,485 A | 1/1998 | Kohno |
| 5,751,330 A | 5/1998 | Austin et al. |
| 5,755,519 A | 5/1998 | Klinefelter |
| 5,771,058 A | 6/1998 | Kobayashi |
| 5,772,199 A | 6/1998 | Green |
| 5,790,162 A | 8/1998 | Adams et al. |
| 5,820,281 A | 10/1998 | Hill et al. |
| 5,820,335 A | 10/1998 | Croteau et al. |
| 5,837,991 A | 11/1998 | LaManna et al. |
| 5,882,127 A | 3/1999 | Amano |
| 5,927,713 A | 7/1999 | Driscoll et al. |
| 5,936,008 A | 8/1999 | Jones et al. |
| 5,941,522 A | 8/1999 | Hagstrom et al. |
| 5,955,774 A | 9/1999 | Kang |
| 5,959,278 A * | 9/1999 | Kobayashi et al. ........... 271/186 |
| 5,966,160 A | 10/1999 | Nardone et al. |
| 5,978,621 A | 11/1999 | Glemser et al. |
| 5,980,011 A | 11/1999 | Cummins et al. |
| 5,984,546 A | 11/1999 | Kameyama |
| 5,999,908 A | 12/1999 | Abelow |
| 6,011,741 A | 1/2000 | Wallace et al. |
| 6,011,948 A | 1/2000 | Amano et al. |
| 6,037,879 A | 3/2000 | Tuttle |
| 6,039,430 A | 3/2000 | Helterline et al. |
| 6,071,024 A | 6/2000 | Chi-Ming et al. |
| 6,072,402 A | 6/2000 | Kniffin et al. |
| 6,076,913 A | 6/2000 | Garcia et al. |
| 6,099,101 A | 8/2000 | Maurelli et al. |
| 6,099,178 A | 8/2000 | Spurr et al. |
| 6,105,493 A * | 8/2000 | Skubic et al. ................ 271/6 |
| 6,113,208 A | 9/2000 | Benjamin et al. |
| 6,163,658 A | 12/2000 | Suzuki |
| 6,179,401 B1 | 1/2001 | Stephens, Jr. et al. |
| 6,213,392 B1 | 4/2001 | Zuppicich |
| 6,236,420 B1 | 5/2001 | Matsuzaka |
| 6,249,303 B1 | 6/2001 | Mochizuki et al. |
| 6,252,791 B1 | 6/2001 | Wallace et al. |
| 6,253,329 B1 | 6/2001 | Kang |
| 6,263,170 B1 | 7/2001 | Bortnem |
| 6,264,296 B1 | 7/2001 | Klinefelter et al. |
| 6,264,301 B1 | 7/2001 | Helterline et al. |
| 6,267,463 B1 | 7/2001 | Paulsen et al. |
| 6,271,928 B1 | 8/2001 | Bullock et al. |
| 6,279,901 B1 | 8/2001 | Fulmer |
| 6,286,828 B1 | 9/2001 | Adema |
| 6,302,527 B1 | 10/2001 | Walker |
| 6,305,795 B2 | 10/2001 | Childers et al. |
| 6,312,083 B1 | 11/2001 | Moore |
| 6,312,106 B1 | 11/2001 | Walker |
| 6,318,914 B1 | 11/2001 | Cuo et al. |
| 6,325,495 B1 | 12/2001 | Foth |
| 6,341,839 B1 | 1/2002 | Burikov et al. |
| 6,362,868 B1 | 3/2002 | Silverbrook |
| 6,371,586 B1 | 4/2002 | Saruta |
| 6,380,965 B1 | 4/2002 | Sims et al. |
| 6,386,772 B1 | 5/2002 | Klinefelter et al. |
| 6,412,991 B1 | 7/2002 | Klinefelter et al. |
| 6,428,132 B1 | 8/2002 | Kubatzki et al. |
| 6,464,317 B2 | 10/2002 | Miyazawa |
| 6,592,032 B1 | 7/2003 | Takaragi et al. |
| 6,631,967 B1 | 10/2003 | Saruta |
| 6,644,771 B1 | 11/2003 | Silverbrook |
| 6,650,351 B2 | 11/2003 | Yamamoto et al. |
| 6,694,884 B2 | 2/2004 | Klinefelter et al. |
| 6,722,649 B2 | 4/2004 | Yui |
| 6,762,780 B2 | 7/2004 | Tsuruta et al. |
| 6,776,470 B2 | 8/2004 | Steinmetz et al. |
| 6,798,434 B2 | 9/2004 | Shibata et al. |
| 7,154,519 B2 | 12/2006 | Meier et al. |
| 7,344,325 B2 | 3/2008 | Meier et al. |
| 7,878,505 B2 | 2/2011 | Meier et al. |
| 2001/0052923 A1 | 12/2001 | Suzuki |
| 2002/0118243 A1 | 8/2002 | Forman |
| 2002/0172537 A1 | 11/2002 | Hamisch, Jr. et al. |
| 2002/0180993 A1 | 12/2002 | Klinefelter et al. |
| 2003/0028766 A1 | 2/2003 | Gass et al. |
| 2003/0059050 A1 | 3/2003 | Hohberger et al. |
| 2003/0128269 A1 | 7/2003 | Squires et al. |
| 2003/0215274 A1 | 11/2003 | Ahn |
| 2004/0022572 A1 | 2/2004 | Bungert et al. |
| 2004/0109715 A1 | 6/2004 | Meier et al. |
| 2004/0114981 A1 | 6/2004 | Meier et al. |

(56) References Cited

U.S. PATENT DOCUMENTS

| | | | |
|---|---|---|---|
| 2004/0223011 A1 | 11/2004 | Adkins et al. | |
| 2005/0019078 A1 | 1/2005 | Meier et al. | |
| 2005/0053406 A1* | 3/2005 | Jones et al. | 400/120.01 |
| 2005/0084315 A1 | 4/2005 | Lodwig et al. | |
| 2006/0281057 A1* | 12/2006 | Jones et al. | 434/129 |

FOREIGN PATENT DOCUMENTS

| | | |
|---|---|---|
| EP | 0562979 A2 | 9/1993 |
| EP | 0887197 A2 | 12/1998 |
| EP | 0979736 A1 | 2/2000 |
| EP | 1095783 A2 | 5/2001 |
| FR | 2770174 A1 | 4/1999 |
| GB | 2120821 | 12/1983 |
| JP | 411105359 | 4/1999 |
| JP | 11265463 | 9/1999 |
| JP | 02002120446 | 4/2002 |
| WO | 9509084 | 4/1995 |
| WO | 9921713 | 5/1999 |
| WO | 9949379 | 9/1999 |
| WO | 03019459 A2 | 3/2003 |
| WO | 2004011268 A1 | 2/2004 |
| WO | 2005070687 A2 | 8/2005 |
| WO | 2011035114 A1 | 3/2011 |

OTHER PUBLICATIONS

"Standard Read/Write Identification IC", by TEMIC Semiconductor GmbH, Heilbronn, Germany, (Apr. 1999).

"Introducing the New SmartGuard™ and SmartShield™ Advanced Security Options", pamphlet by Fargo Electronics, Inc., Eden Prairie, Minnesota (1998).

"RFID Tagging IC is First to Accept Input from Sensors", by Microchip Technology Inc., (undated).

Two page website advertisement from SEIKO Precision, entitled "The latest design for your CD-R", re: CD Printer 2000.

Two page website advertisement from SEIKO Precision, entitled "CD Printer 2000".

Partial International Search for International Application No. PCT/US01/17146, filed May 25, 2001 (with invitation to Pay Fees).

International Search Report for International Application No. PCT/US00/01697, filed Jan. 21, 2000, dated Oct. 18, 2000.

Streamfeeder-ST 1250 Universal Friction Feeder; last modified Feb. 27, 2000; 1 page with heading of "Streamfeeder—Product Index"; and 3 pages with heading of "Streamfeeder-ST 1250 Universal Friction Feeder".

International Search Report and Written Opinion from corresponding PCT/US2010/049268, mailed Feb. 8, 2011.

* cited by examiner

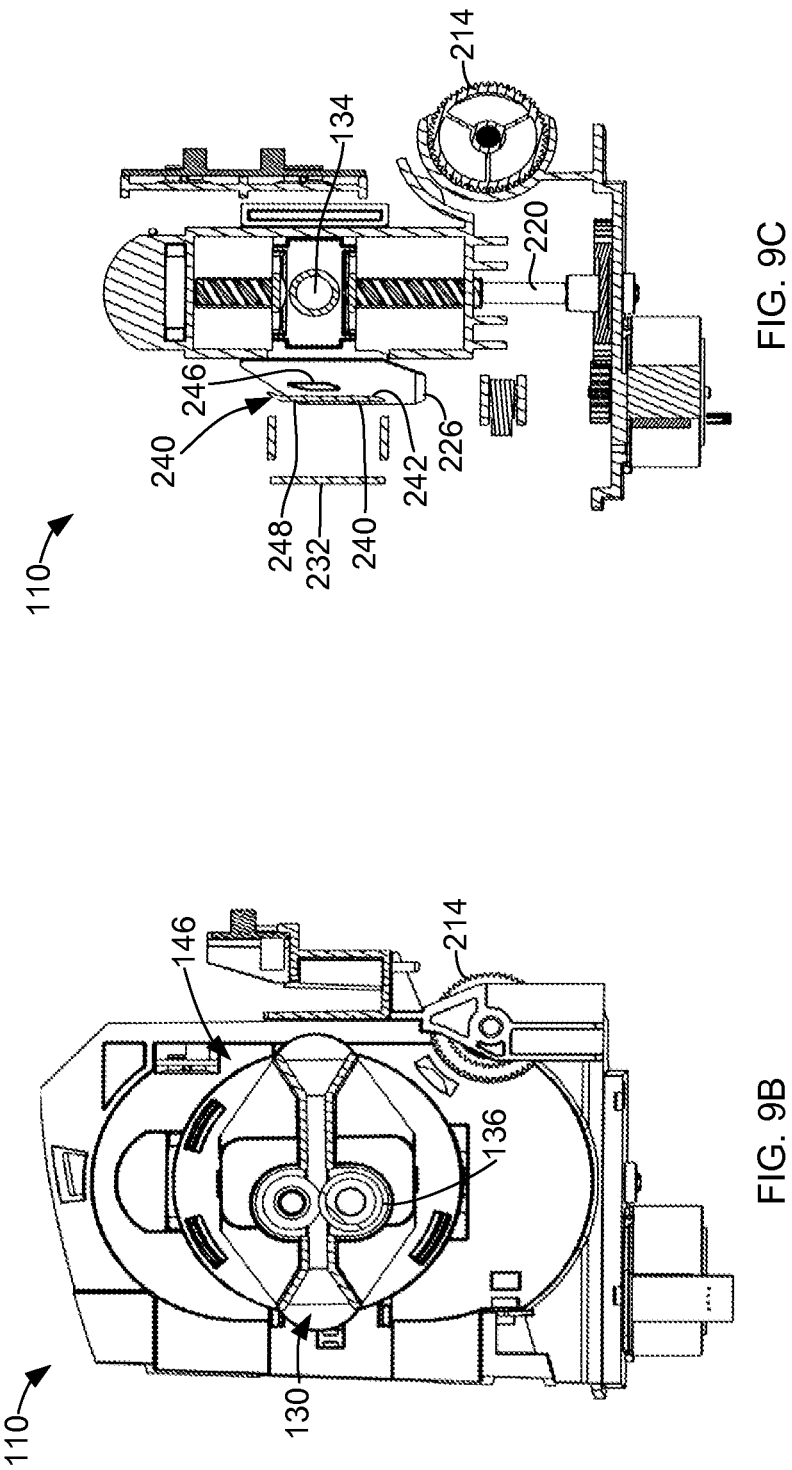

CARD SUBSTRATE ROTATOR WITH LIFT MECHANISM

BACKGROUND

Credentials include identification cards, driver's licenses, passports, and other documents. Such credentials are formed from credential or card substrates including paper substrates, plastic substrates, cards and other materials. Such credentials generally include printed information, such as a photo, account numbers, identification numbers, and other personal information. A secure overlaminate may also be laminated to the surfaces of the credential substrate to protect the surfaces from damage and, in some instances, provide a security feature (e.g., hologram). Additionally, credentials can include data that is encoded in a smartcard chip, a magnetic stripe, or a barcode, for example.

Such credentials are generally formed using a card substrate or credential processing device that processes a card substrate to produce the credential. Occasionally, it is desirable to perform a process, such as a printing process, laminating process, a data reading process, a data writing process, or other process, on both sides of the card substrate. Such dual-sided processing can be made possible through the use of a card substrate rotator that can flip the card substrate for processing on both sides of the card substrate by a single substrate processing component (i.e., print head, laminating roller, etc.). This allows the card substrate processing device to avoid the use of dual substrate processing components that are each configured to perform a process on one of the sides of the card substrate.

SUMMARY

Embodiments of the present invention are directed to a card substrate rotator, card substrate processing devices that include the card substrate rotator, and methods of processing a card substrate using the card substrate rotator. One exemplary embodiment of the card substrate rotator includes a substrate support, a rotator mechanism and a lift mechanism. The substrate support is configured to receive a card substrate. The rotator mechanism is configured to rotate the substrate support about an axis. The lift mechanism is configured to move the substrate support and the axis in a vertical plane.

One exemplary embodiment of the card substrate processing device comprises a first substrate processing component, a first processing path that is in line with the first substrate processing component and a first portal, a second substrate processing component, a second processing path in line with the second substrate processing component and a second portal. In one embodiment the second processing path is above the first processing path. One embodiment of the card substrate processing device includes a card substrate rotator that comprises a substrate support, a rotator mechanism and a lift mechanism. The substrate support is configured to receive a card substrate. The rotator mechanism is configured to rotate the substrate support about an axis. The lift mechanism is configured to move the substrate support and the axis in a vertical plane between a first position, in which the substrate support is aligned with the first portal and the first processing path, and a second position, in which the substrate support is aligned with the second portal and the second processing path.

In one embodiment of the method, a substrate processing device is provided. The substrate processing device comprises a first substrate processing component, a first processing path in line with the first substrate processing component and a first portal, and a card substrate rotator. The card substrate rotator comprises a substrate support configured to receive a card substrate, a rotator mechanism configured to rotate the substrate support about an axis, and a lift mechanism configured to move the substrate support and the axis in a vertical plane. In one embodiment of the method, a card substrate is processed using the first substrate processing component. The card substrate is then fed along the first processing path, through the first portal and into the substrate support. The substrate support, the card substrate and the axis are moved away from the first processing path in a direction that is transverse to the first processing path using the lift mechanism.

Other features and benefits that characterize embodiments of the invention will be apparent upon reading the following detailed description and review of the associated drawings.

BRIEF DESCRIPTION OF THE DRAWINGS

FIGS. 8A-8C, 9A-9C, 10A-10C, 11A-11C and 12A-12C provide different views of an exemplary substrate rotator during different stages of a rotation operation in accordance with embodiments of the invention.

DETAILED DESCRIPTION OF ILLUSTRATIVE EMBODIMENTS

Figure 1:
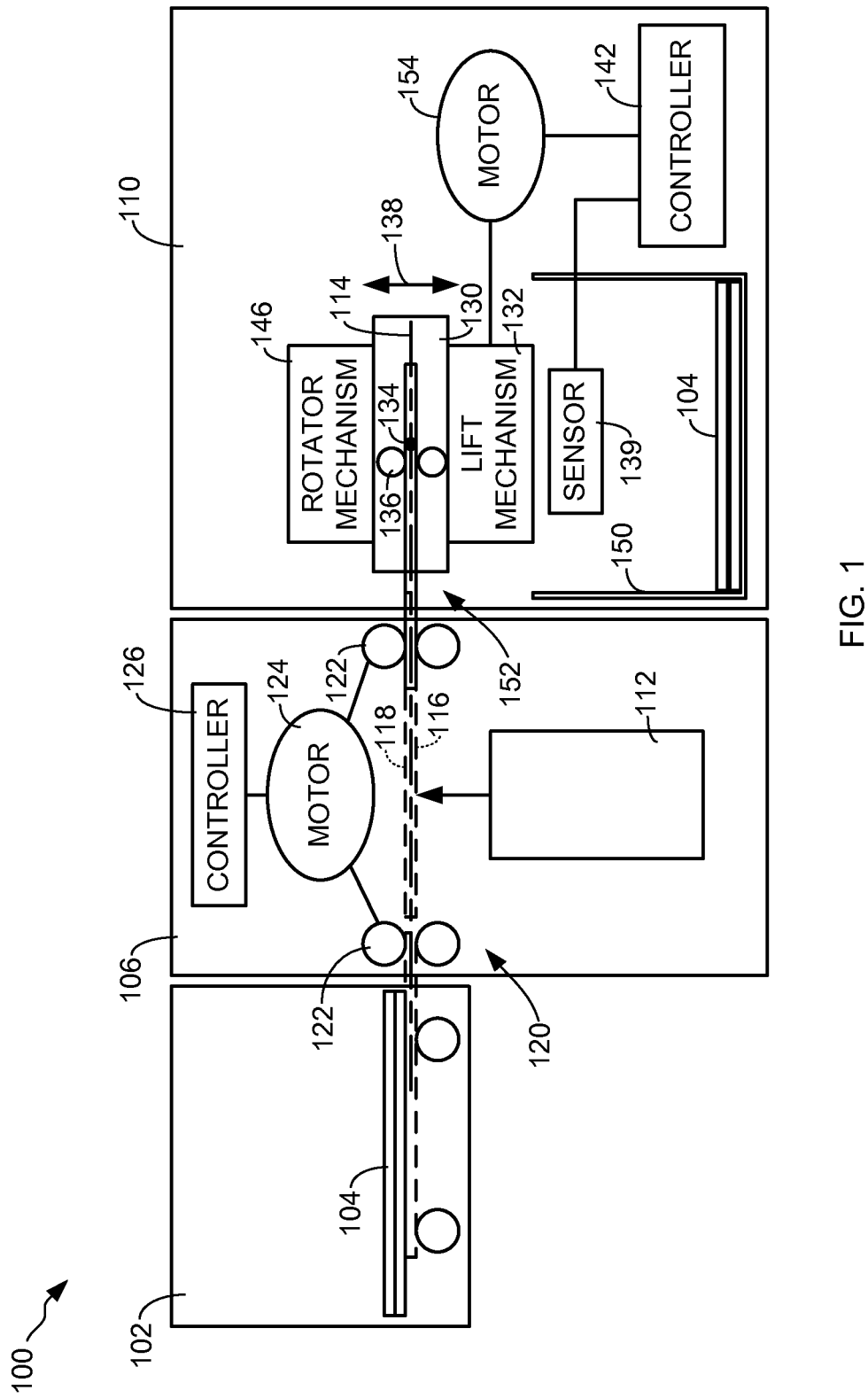
FIG. 1 is a schematic diagram of a card substrate processing device in accordance with embodiments of the invention.

FIG. 1 is a schematic diagram of a card substrate processing device 100 in accordance with embodiments of the invention. As used herein, "card substrate" includes credential substrates used to form credentials, such as identification cards, drivers licenses, passports, and other credentials. Exemplary card substrates include paper substrates other than traditional paper sheets used in copiers or paper sheet printers, plastic substrates, rigid and semi-rigid card substrates and other materials.

The card processing device 100 generally includes a substrate supply 102 configured to contain one or more individual card substrates 104, a card processor 106 and a card substrate rotator 110. The card processor 106 includes a card processing component 112 that is configured to perform a process on a card substrate 104 that is presented to the card processing component 112 along a processing path 114.

One embodiment of the card processing component 112 includes a print head for printing an image to a surface 116 of a card substrate 104. The print head can be used to either directly print the image to the surface 116, such as a bottom surface (as shown) or a top surface 118, or print an image to an image transfer film, from which the printed image is transferred to the bottom surface 116 or the top surface 118 of the card substrate 104, in accordance with conventional techniques. Such a print head generally utilizes a print consumable, such as ink or a print ribbon.

Another embodiment of the card processing component 112 comprises a laminating roller configured to laminate an overlaminate film to the bottom surface 116 or the top surface 118 of the card substrate 104, in accordance with conventional lamination techniques.

In accordance with another embodiment, the card processing component 112 includes a data reader/writer that is configured to read data from and/or write data to the card substrate 104. In one embodiment, the data writer is configured to read data from and/or write data to a memory chip embedded in the card substrate 104, to read data from and/or write data to a magnetic stripe of the card substrate 104, or read data from and/or write data to another component of the card substrate 104.

A card transport 120 is configured to feed individual card substrates 104 along the processing path 114 for processing by the card processing component 112. Embodiments of the card transport 120 include feed rollers 122 that are driven by a motor 124, or other conventional card transport. The card transport 120 is configured to feed individual cards from the substrate supply 102 along the processing path 114 for processing by the card processing component 112 and for delivery to the substrate rotator 110.

In one embodiment, the card processor 106 includes a controller 126 that is generally configured to control the operations of the card processor 106 including the motor 124 driving the feed rollers 122 of the transport mechanism 120, and the card processing component 112 to process individual card substrates 104 fed from the substrate supply 102 responsive to a card processing job. The card processing job generally comprises instructions generated by a card processing application, which is typically executed on a computer, for example. One embodiment of the controller 126 comprises one or more processors and memory, which execute the instructions of the card processing job through the control of the components of the device 100.

One embodiment of the substrate rotator 110 includes a substrate support 130 and a lift mechanism 132. The substrate support 130 is generally configured to receive individual card substrates 104 fed along the processing path 114 by the card transport 120, as illustrated in FIG. 1. The plane of the card substrate 104 is generally parallel to the plane of the processing path 114. The substrate support 130 is also configured to rotate about an axis of rotation 134. One embodiment of the substrate support 130 comprises feed rollers 136 that are configured to receive the card substrate 104 from the card processor 106 and discharge card substrates 104 from the substrate support 130 back to the card transport 120 of the card processor 106. In one embodiment, the feed rollers 136 of the substrate support 130 are driven by the motor 124 of the card processor 106 through an appropriate gear train or other mechanical linkage. In another embodiment, a separate motor (not shown) is used to drive the feed rollers 136. In one embodiment, the axis 134 extends through the card substrate 104 received in the substrate support 130.

The lift mechanism 132 is configured to move the substrate support 130 and the axis 134, about which the substrate support 130 rotates. In one embodiment, this movement is along a plane, such as a vertical plane, generally represented by arrow 138, or a horizontal plane. While the particular embodiments described below reference the movement of the substrate support 130 and the axis 134 in the vertical plane 138, it is understood that such movement can also be in a horizontal or other plane that is transverse to the depicted vertical plane 138.

Figure 2A:
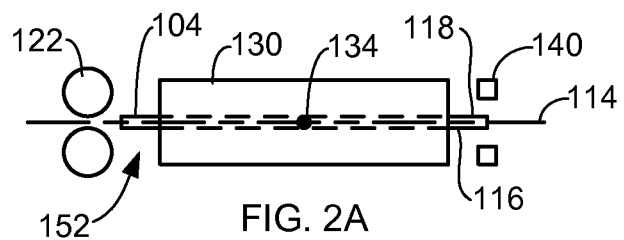
FIGS. 2A-D are schematic diagram of various positions of a substrate support relative to the processing path, in accordance with embodiments of the invention.

In one embodiment, the vertical plane 138 is transverse to the processing path 114. In one embodiment, the vertical plane 138 is perpendicular to the processing path 114. When the substrate support 130 is aligned with the processing path 114, as shown in FIG. 1 and FIG. 2A, it is in position to either receive a card substrate 104 at a portal 152 from the feed rollers 122 of the card transport 120, or discharge a card substrate 104 back to the card processor 106 through the portal 152.

In one embodiment, a sensor 139 detects a vertical position of the substrate support 130. In one embodiment, the sensor 139 detects a position, in which the substrate support 130 is aligned with the processing path 114. The sensor 139 provides an output signal indicative of a position of the substrate support 130 that is received by the controller 142. The controller 142 uses the output signal from the sensor 139 to control operations of the substrate rotator 110.

FIGS. 2A-D are schematic diagram of various positions of the substrate support 130 relative to the processing path 114, in accordance with embodiments of the invention. Other components of the device 100 have been removed from FIGS. 2A-D, such as those of the card processor 106 and the substrate rotator 110, to simplify the illustrations.

In one embodiment, the substrate rotator 110 includes a sensor 140 that is configured to detect when the card substrate 104 is fully received by the substrate support 130. The sensor 140 can be an optical sensor or other sensor suitable for detecting the receipt of a card substrate 104 in the substrate support 130.

In one embodiment, the substrate rotator 110 includes a controller 142 for controlling operations of the substrate rotator 110 as described herein. In one embodiment, the controller 142 receives a signal from the sensor 140 indicating that a card substrate 104 has been fully received within the substrate support 130. The controller 142 then stops the feeding of the substrate 104 by the feed rollers 136 to complete the loading of the substrate 104 in the substrate support 130.

Figure 2B:
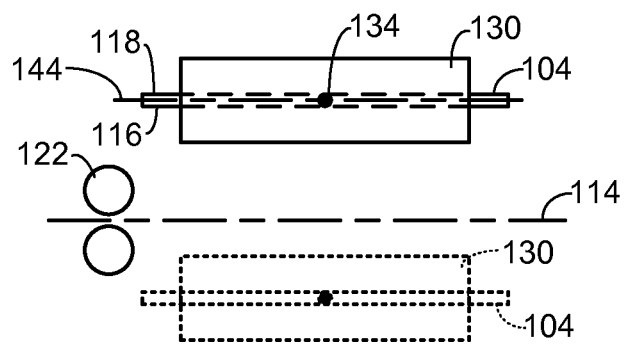

As mentioned above, the lift mechanism 132 is configured to move the substrate support 130 and the axis 134 in the vertical plane 138. Thus, the lift mechanism 132 can raise the substrate support 130 and the axis 134 above the processing path 114, or below the processing path 114 (shown in phantom), as shown in FIG. 2B. While the description that follows primarily describes the lift mechanism 132 as raising the substrate support 130 above the processing path 114, it is understood that embodiments of the invention include the movement of the substrate support 130 below the processing path 114 as well.

In one embodiment, the substrate support 130 moves in the vertical plane 138 using the lift mechanism 132 while maintaining a plane 144 of the card substrate 104 substantially parallel to the plane of the processing path 114, as shown in FIG. 2B.

Figure 2C:
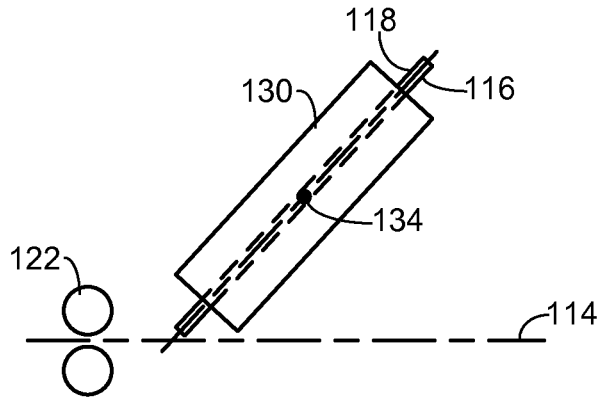

One embodiment of the substrate rotator 110 includes a rotator mechanism 146 that is configured to rotate the substrate support 130 about the axis 134. In one embodiment, this rotation of the substrate support 130 takes place after the substrate support 130 has been displaced from the processing path 114 along the vertical plane 138. That is, the rotation of the substrate support 130 about the axis 134 takes place after the axis 134 has been moved along the vertical plane 138 to a position that is either above or below the processing path 114. In one embodiment, the axis 134 is raised above the processing path 114 prior to performing rotation operations using the rotator mechanism 146, as illustrated in FIG. 2C.

Figure 2D:
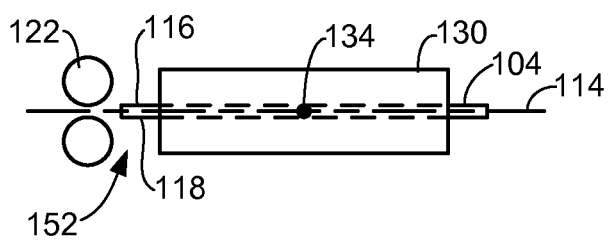

In one embodiment, the rotator mechanism 146 operates to rotate the card substrate 104, received in the substrate support 130, 180 degrees (i.e., invert the substrate) and return the substrate support 130 and the card substrate 104 to a position, in which they are again in line with the processing path 114, as shown in FIG. 2D. The result of the rotation of the substrate support 130 about the axis 134 positions the card substrate 104 in the processing path 114 with the surface 118 positioned below the surface 116. The feed rollers 136 of the substrate rotator 110 can then feed the card substrate 104 back to the card processor 106 for processing of the surface 118 of the card substrate 104 by the card processing component 112.

In accordance with one embodiment, after the processing of the card substrate 104 by the card processor 106, the processed card substrate 104 can be discharged into a card hopper 150 positioned directly below the substrate support 130. In one embodiment, the substrate support 130 is raised along the vertical plane 138 using the lift mechanism 132 to move the substrate support 130 above the processing path 114, such as illustrated in FIG. 2B, but without a card substrate 104 in the substrate support 130. The processed card substrate 104 is then fed back through the portal 152 by the feed rollers 122 of the card transport 120 until the processed card substrate 104 drops into the card hopper 150. This configuration of placing the output card hopper 150 beneath the rotatable substrate support 130 allows the device 100 to be made more compactly than prior art designs.

In one embodiment, the lift mechanism 132 comprises a motor 154, which is illustrated separately in FIG. 1. The controller 142 controls the raising and lowering of the substrate support 130 through the control of the motor 154.

In one embodiment, the rotation of the substrate support 130 about the axis 134 is performed responsive to the movement of the substrate support 130 along the vertical plane 138. That is, the rotation of the substrate support 130 about the axis 134 is driven by the movement of the substrate support along the vertical plane 138 by the lift mechanism 132.

Figure 3:
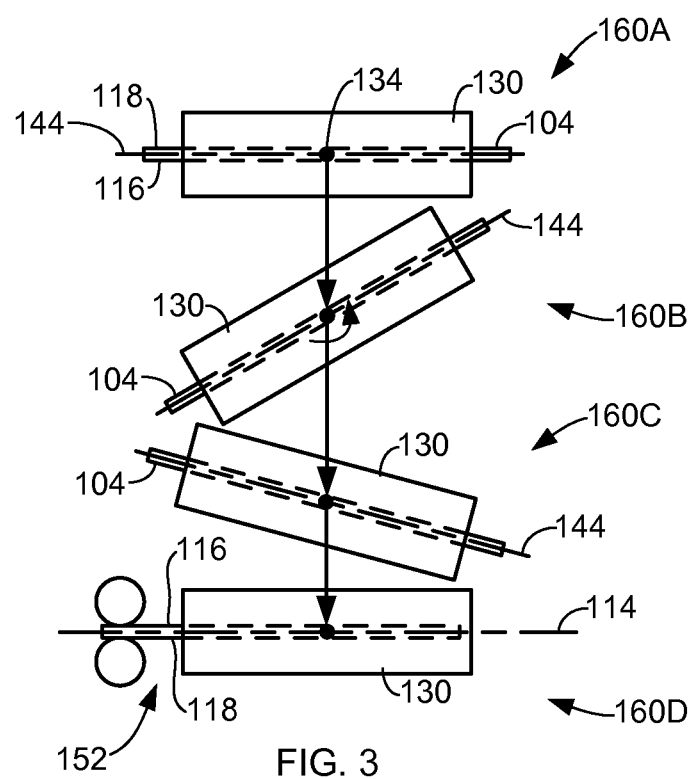
FIG. 3 illustrates a rotation operation of a substrate support in accordance with embodiments of the invention.

FIG. 3 illustrates a rotation operation on the substrate support 130 by the rotator mechanism 146 in accordance with embodiments of the invention. In one embodiment, the substrate support 130 is initially raised above the processing path 114 to a position 160A without rotating the substrate support 130 about the axis 134. Thus, the substrate support 130 and the card substrate 104 are orientated in approximately the same position they were in when the card substrate 104 was initially received by the substrate support 130. As the lift mechanism 132 moves the substrate support 130 back toward the processing path 114, the rotator mechanism 146 rotates the substrate support 130 180 degrees about the axis 134, as shown in FIG. 3. The direction of rotation of the substrate support 130 can be either clockwise or counter-clockwise (as shown). In one embodiment, the lift mechanism 132 returns the substrate support 130 to an aligned position 160D with the processing path 114 where the card substrate 104 can be discharged from the substrate support 130 back through the portal 152 and to the card processor 106 for further processing.

In accordance with another embodiment, the rotator mechanism 146 operates in the opposite manner as that described above with regard to FIG. 3 by rotating the substrate support 130 as it is moved away (e.g., raised or lowered) from the processing path 114 by the lift mechanism 132. Thus, the substrate support 130 will complete a rotation about the axis 134 as it reaches an outer displaced position from the processing path 114. The substrate support 130 can then be brought back into alignment with the processing path 114 using the lift mechanism 132 and the card substrate 104 can be fed back to the card processor 106 for further processing.

Figure 4:
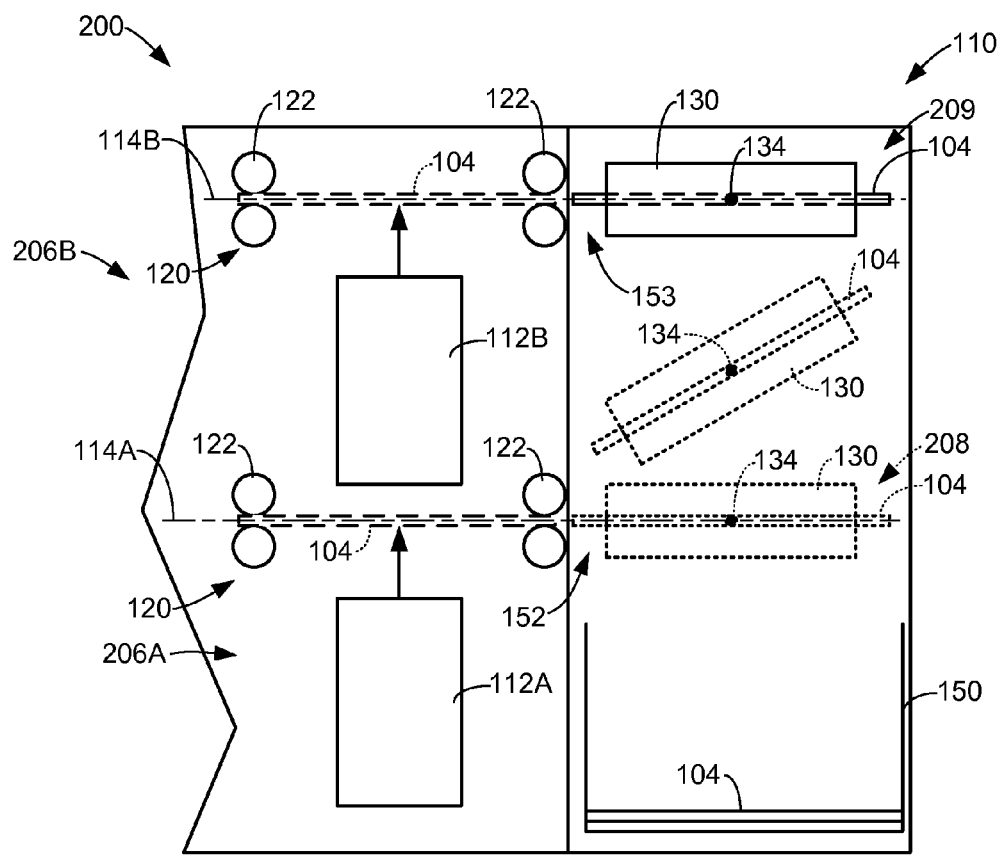
FIG. 4 is a schematic diagram of a card substrate processing device in accordance with embodiments of the invention.

FIG. 4 is a schematic diagram of a card processing device 200 in accordance with embodiments of the invention. One embodiment of the device 200 includes first and second card processors 206A and 206B, which respectively include card processing components 112A and 112B. The processors 206A and 206B can be separate modules. Each of the card processors 206A and 206B operate similarly to the card processor 106 described above with reference to FIG. 1. The processing components 112A and 112B can be configured to perform a process on individual card substrates that are presented along processing path 114A and 114B, respectively. While depicted was performing a process on a bottom surface of a card substrate 104, the card processing components 112A and 112B can be configured to perform a process on either the top or bottom surface of the card substrate 104. One embodiment of the device 200 includes at least one substrate supply 102 (FIG. 1), from which individual card substrates 104 can be fed along the processing path 114A and/or 114B.

In operation, the device 200 performs a process (e.g., printing, laminating, data reading or writing, etc.) on a card substrate 104, such as using the first card processing component 112A, and the card substrate 104 is passed to the substrate support 130 in a first position 208 that is aligned with the processing path 114A, as illustrated in FIG. 4. The substrate support 130 can then be raised using the lift mechanism 132 to place the substrate support 130 and the received card substrate 104 in a second position 209 that is aligned with the processing path 114B, as shown in FIG. 4. The raising of the substrate support 130 in alignment with the processing path 114B may include a rotating operation on the substrate support 130 using the rotator 146, as described above. Alternatively, the substrate support 130 may be raised in alignment with the processing path 114B without rotating the substrate support 130 about the axis 134. In this manner, the second card processing component 112B can perform a process on one of the surfaces of the card substrate, including one that was previously processed by the first processing component 112A.

The substrate rotator 110 may be modified slightly to accommodate the second card processor 206B by lengthening the height at which it can raise the substrate support 130, for instance. Otherwise, the substrate rotator operates similarly to that described herein.

For instance, the first processing component 112A may be in the form of a print head that is configured to print an image to a surface of the card substrate 104. After the card substrate 104 is fed through the first portal 152 and received by the substrate support 130 in the first position 208, the substrate support 130 can be raised using the lift mechanism 132 to the second position 209 without rotating the substrate support 130 to place the support 130 and the card substrate in alignment with the processing path 114B. The substrate 104 can then be fed through a second portal 153 along the processing path 114B for processing by the second processing component 112B. For example, the processing component 112B may be in the form of a laminator, which applies an overlaminate to the printed surface of the card substrate 104. As a result, embodiments of the device 200 allow for different processing components 112 to perform processes on one or both sides of the card substrate 104.

As with the device 100 of FIG. 1, the card substrate can be discharged into the card hopper 150 by placing the card substrate in the processing path 114A and raising the substrate support 130 above the processing path 114A. The card substrate 104 can then be discharged into the card hopper 150 using the feed rollers 122.

The substrate rotator 110 may be formed integral with the card processor 106, or formed as a separate module that can be attached to the card processor 106. Additionally, the second card processor 206B may be formed integrally with the first card processor 206A or separately as an attachable module. This allows a user to customize the device 100 or 200 in accordance with his or her needs.

FIGS. 5-13 illustrate an exemplary implementation of embodiments described above. Elements having the same or similar numbers as those discussed above generally correspond to the same or similar elements, or embodiments of the elements described above.

Figure 5:
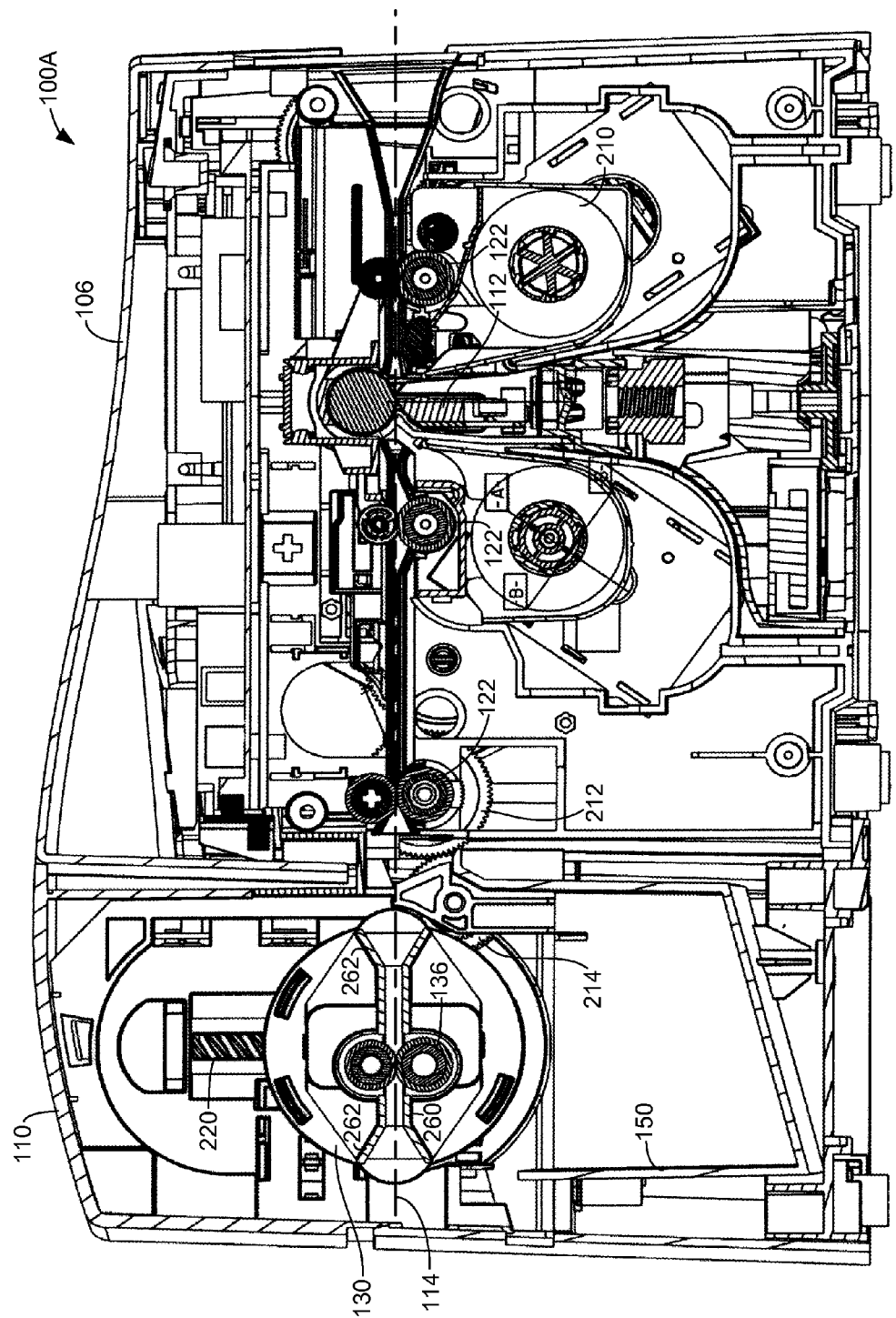
FIG. 5 is a side cross-sectional view of an exemplary card substrate processing device in accordance with embodiments of the invention.

FIG. 5 is a side cross-sectional view of an exemplary card substrate processing device 100A in accordance with embodiments of the invention. As with the card substrate processing device 100, the card substrate processing device 100A includes a card processor 106 and a card substrate rotator 110. In one embodiment, the device 100A includes a substrate supply or card holder 102, which attaches to the side of the device 100A that is opposite the rotator 110, but is not shown in FIG. 5. Similar elements to those illustrated in FIGS. 1-4 are identified in FIG. 5. Embodiments of the device 100A include the components described above with regard to device 100, although not depicted in FIG. 5.

The exemplary card processing component 112 of the device 100A is in the form of a print head. A supply of print ribbon 210, which can be stored in a ribbon cartridge, for example, is also illustrated. The print head is configured to print on a bottom surface, such as surface 116 (FIG. 1), of a card substrate 104 (not shown) that is fed along the processing path 114 by the feed rollers 122 of the card transport. In one embodiment, the feed rollers 122 are driven by a motor (not shown) that drives a gear train including the gears 212, which drives the feed rollers 122.

The device 100A can include a housing 216 that encloses the interior components. Additionally, a control panel can be provided on the housing for direct control of the functions of the device 100A.

Figures 6, 7:
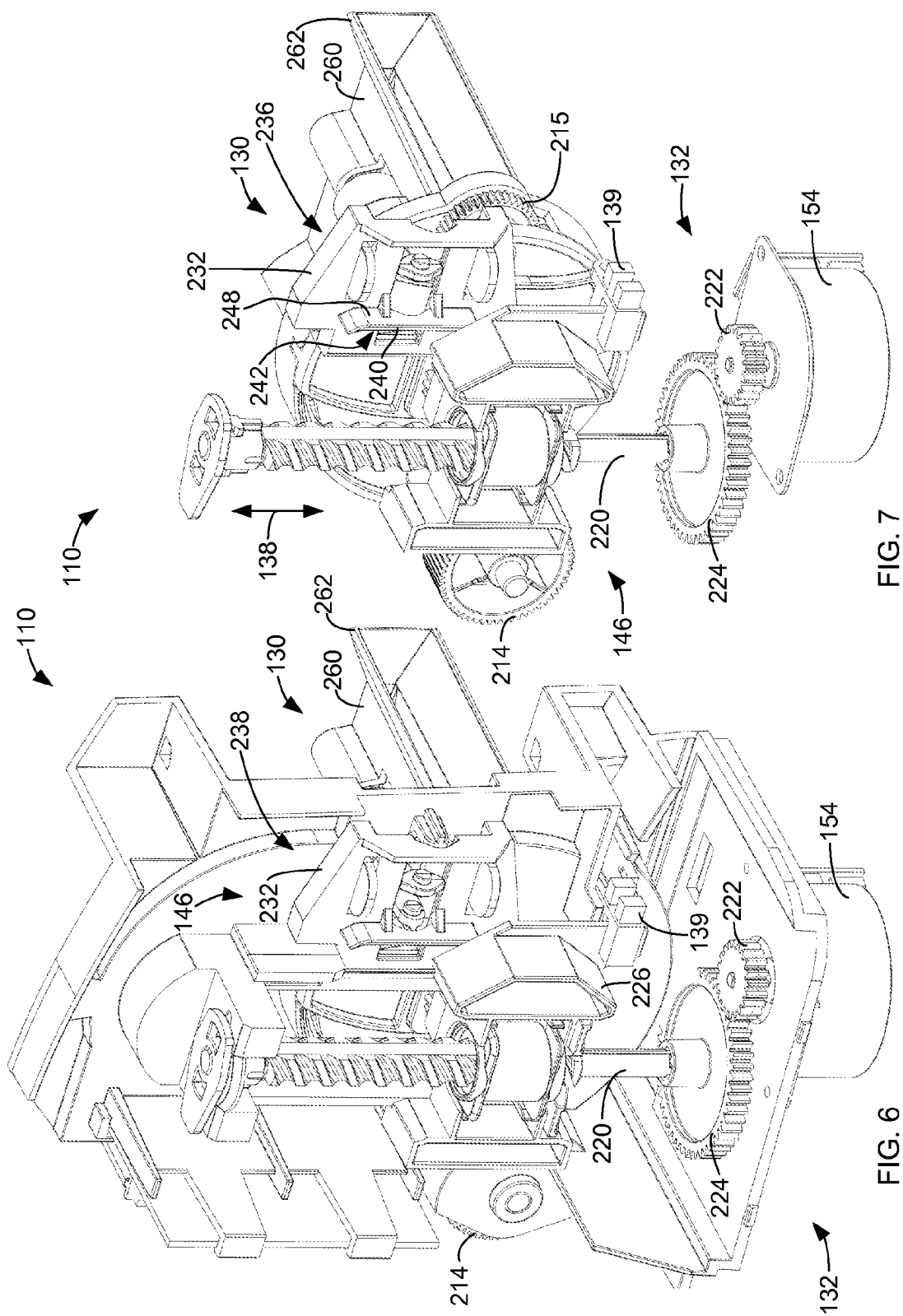
FIGS. 6 and 7 are rear isometric views of components of an exemplary substrate rotator in accordance with embodiments of the invention.
Figure 8B:
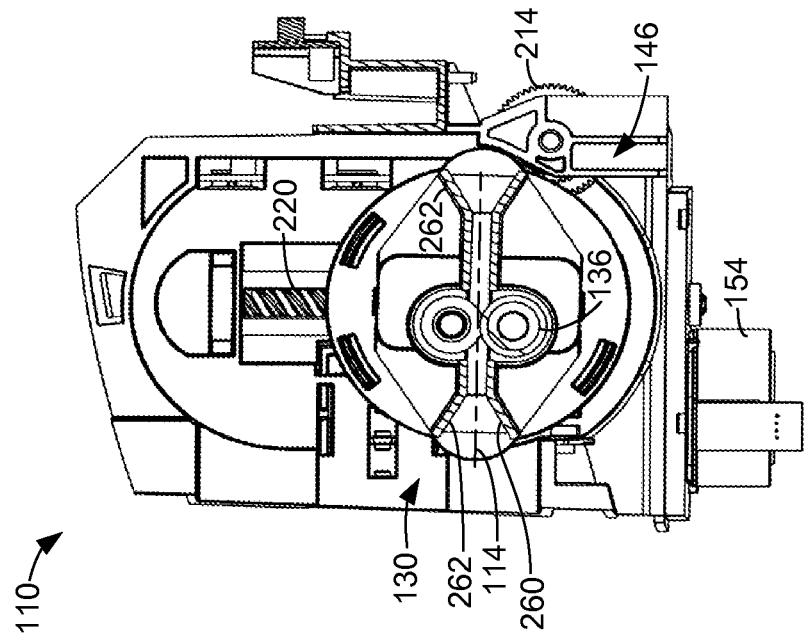
Figure 8A:
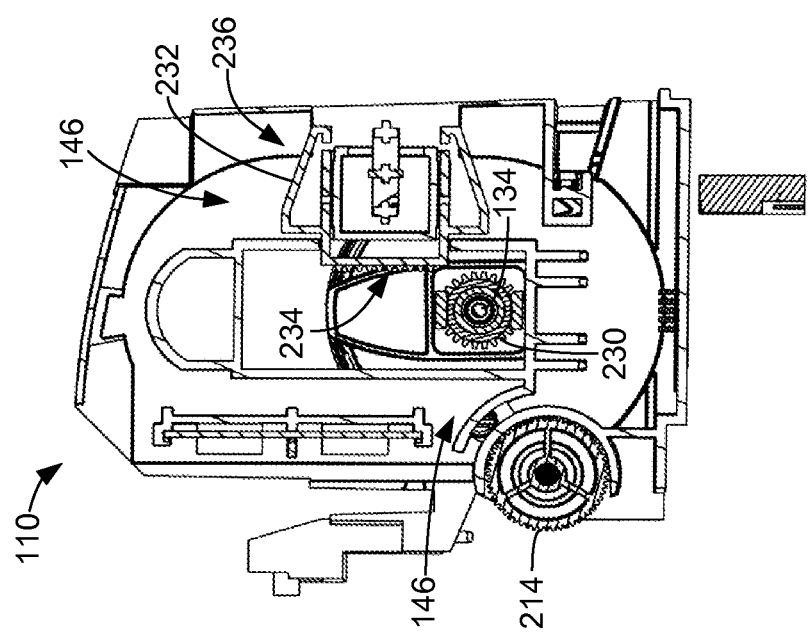
Figure 13:
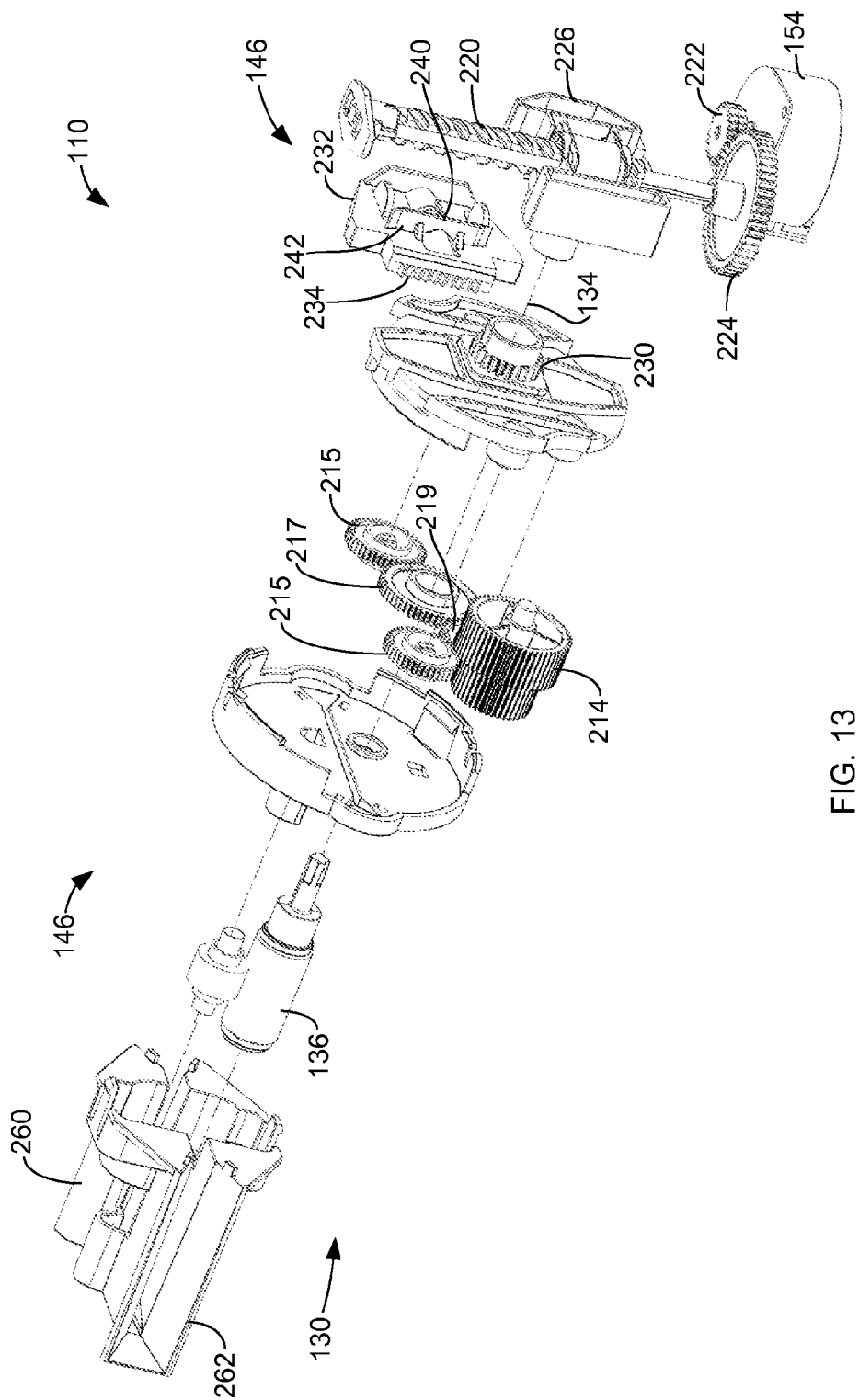
FIG. 13 is an exploded isometric view of components of an exemplary substrate rotator in accordance with embodiments of the invention.

FIGS. 6 and 7 are rear isometric views of components of the substrate rotator of FIG. 5. Several elements are removed in FIG. 7 to simplify the illustration. FIG. 13 is an exploded isometric view of the components of the substrate rotator 110 shown in FIG. 7.

In one embodiment, the substrate rotator 110 includes a gear 214 that engages the gear 212. A gear 215 is provided on either side of the substrate support 130. One of the gears 215, depending on the orientation of the substrate support 130, engage the gear 214 when the substrate support 130 is aligned with the processing path 114. On one side, the gear 215 directly engages a main gear 217 (FIG. 13), which drives feed roller 136. A gear train comprising gear 219 connects the gear 215 on the other side to the main gear 217. Thus, when the substrate support 130 is aligned with the processing path 114 (FIG. 5), the motor driving the gear 212 also drives the feed rollers 136. This allows the substrate rotator 110 to utilize the feed motor 154 of the card processor 106. Thus, in one embodiment, the substrate rotator 110 does not include a dedicated motor whose sole purpose is to drive the operation of the substrate rotator 110.

One embodiment of the substrate support includes a substrate guide 260 that includes flared openings 262 to guide the receipt of a card substrate from the feed rollers 122 of the processing path 114, or first and second processing paths 114A and 114B (FIG. 4). In one embodiment, the substrate support 130 supports the gears 215, 217 and 219.

One embodiment of the lift mechanism 132 comprises the motor 154 and a lead screw 220, as shown in FIGS. 6 and 7. The rotation of the lead screw 220 is driven by the motor 154 through gears 222 and 224. In one embodiment, the lift mechanism 132 includes a bracket 226, which is attached to the lead screw 220 and the substrate support 130. The bracket 226 moves in response to rotation of the lead screw 220. In one embodiment the bracket 226 moves in the vertical plane 138 responsive to rotation of the screw 220. Due to the attachment of the substrate support 130 to the bracket 226, the substrate support 130 also moves in the vertical plane 138 responsive to the rotation of the lead screw 220. Accordingly, the rotation of the lead screw 220 raises or lowers the substrate support 130 relative to the processing path 114, as illustrated in FIGS. 2B and 3.

FIGS. 8A-8C, 9A-9C, 10A-10C, 11A-11C and 12A-12C provide different views of the substrate rotator 110 during different stages of a rotation operation. Each A-C series of figures respectively show a rear cross-sectional view, a front cross-sectional view wherein the cross-section is taken through the substrate support 130, and a front cross-sectional view wherein the cross-section is taken rearward of the substrate support 130, of the substrate rotator 110 at various stages of a substrate rotation operation.

One embodiment of the substrate rotator mechanism 146 includes a rotator gear 230 and a rack gear 232. The rotator gear 230 is coupled to the substrate support 130 (FIG. 13) and rotates about the axis 134 with the substrate support 130. One embodiment of the rack gear 232 includes gear teeth 234 that face the rotator gear 230. In one embodiment, the rack gear 232 is movable between a withdrawn position 236 (FIGS. 7, 9A), in which the gear teeth 234 are withdrawn from the path the rotator gear 230 travels during movement in the vertical plane 138, and an engaging position 238 (FIGS. 6, 10A and 11A), in which the gear teeth 234 are positioned within the path of the rotator gear 230. The rack gear 232 moves relative to the rotator gear 230 between the withdrawn position 236 and the engaging position 238 by sliding along a rail or shaft, or other suitable configuration.

As discussed above with reference to FIG. 3, one embodiment of the substrate rotator 146 rotates the substrate support 130 about the axis 134 responsive to the movement of the substrate support 130 along the vertical plane 138 by the lift mechanism 132. In one embodiment, the rotation of the substrate support 130 about the axis 134 responsive to movement of the substrate support 130 along the vertical plane 138 occurs when the rack gear 232 is in the engaging position 238 and does not occur when the rack gear 232 is in the withdrawn position 236.

Figure 9A:
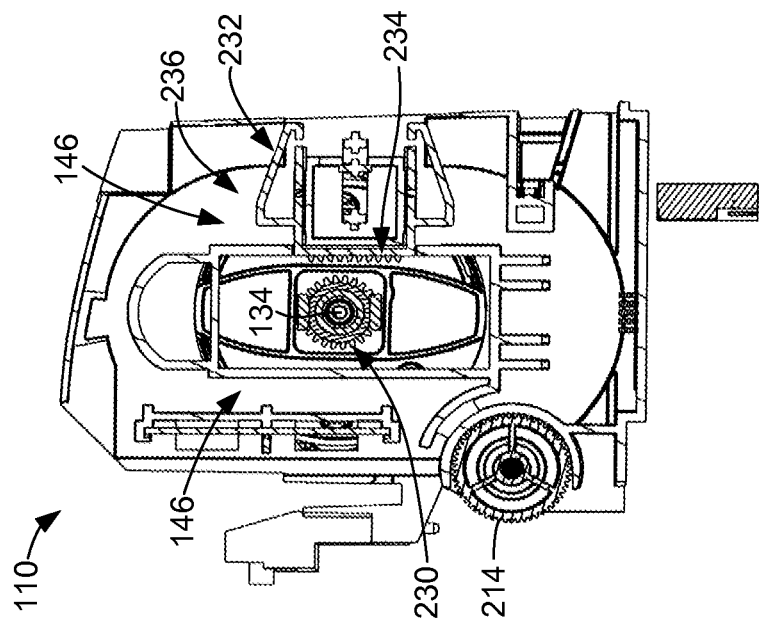
Figure 8C:
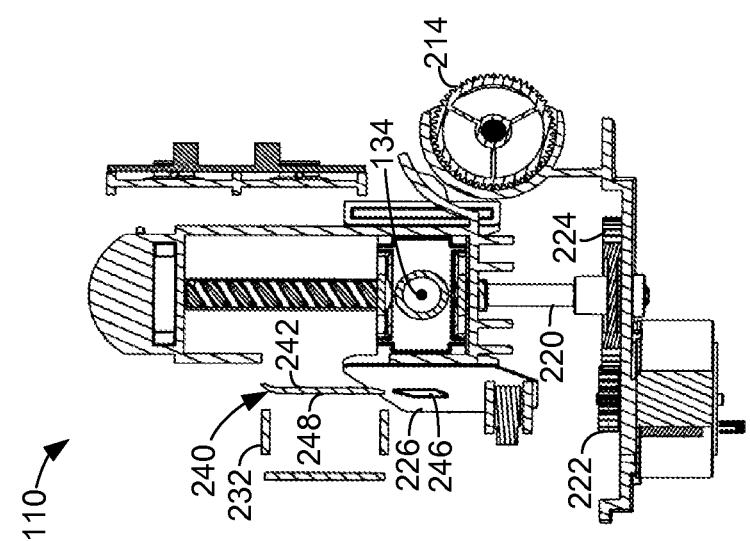
Figure 10A:
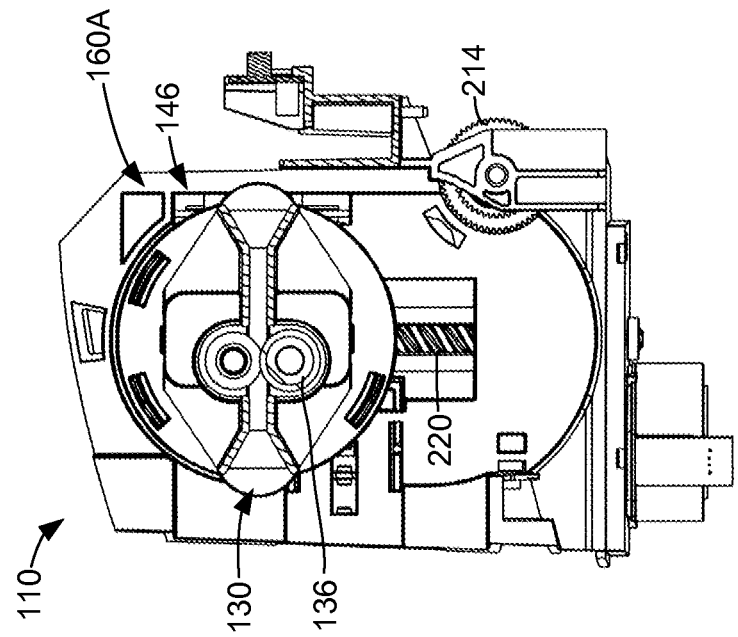
Figure 10B:
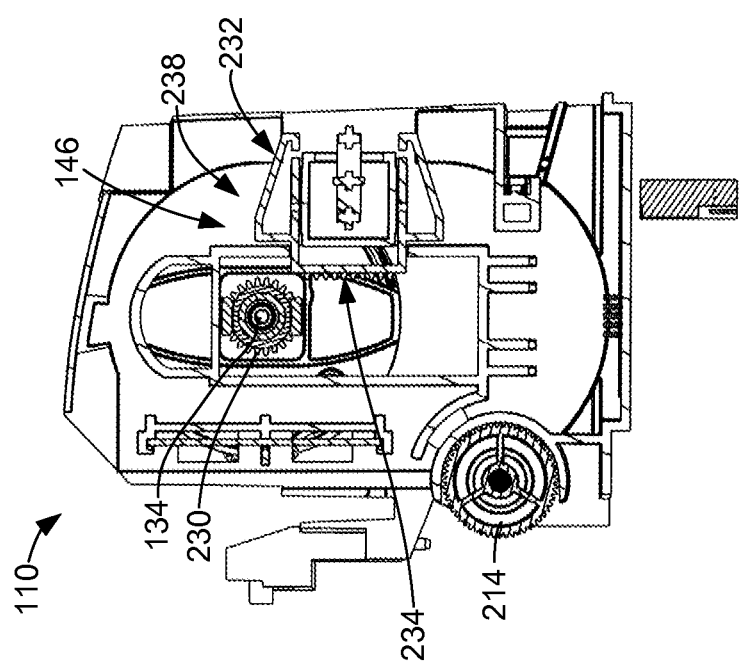
Figure 11A:
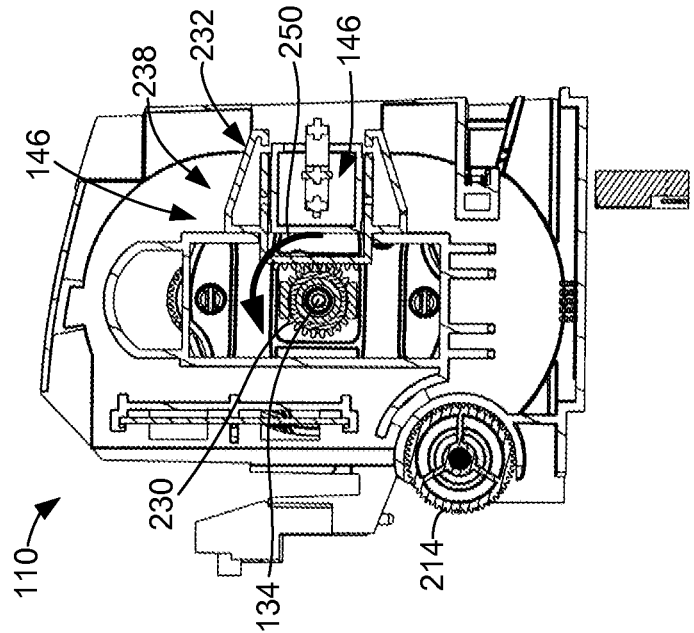
Figure 11C:
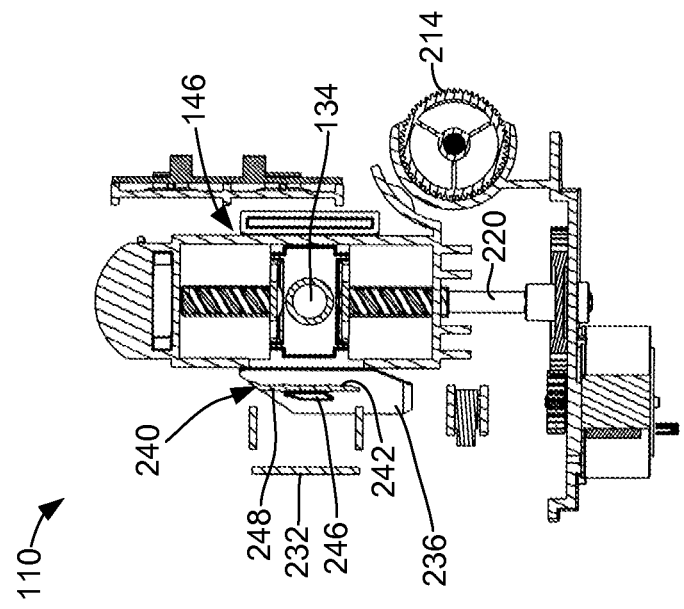
Figure 11B:
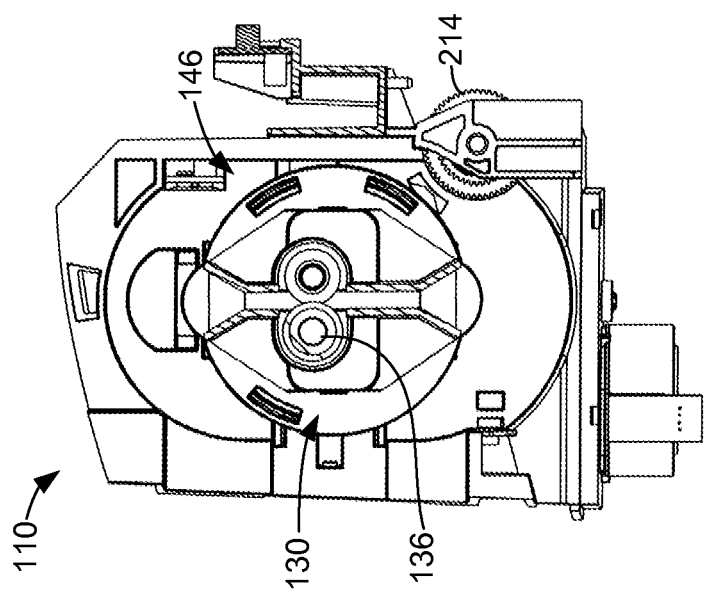
Figure 12A:
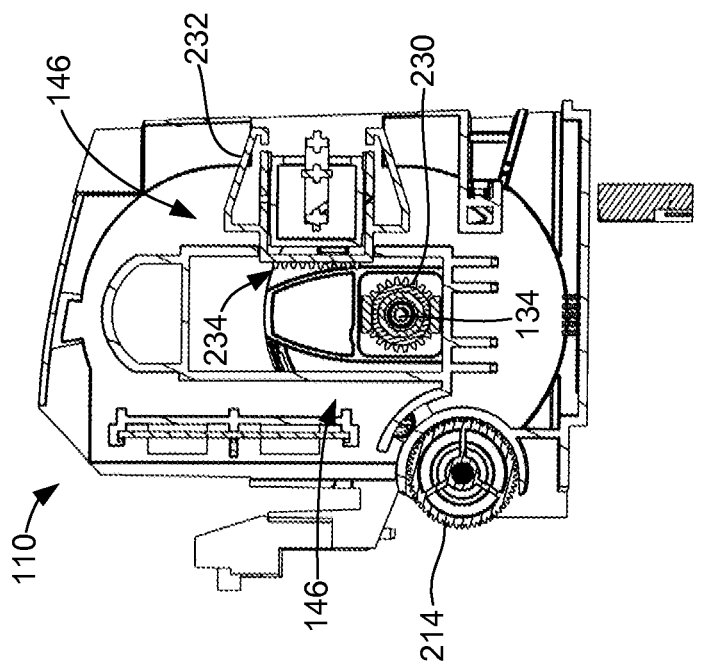
Figure 12B:
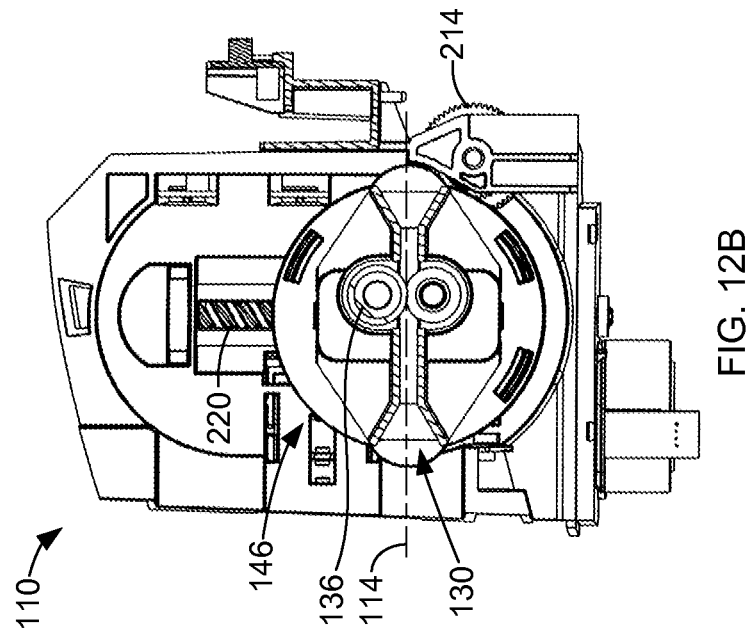
Figure 12C:
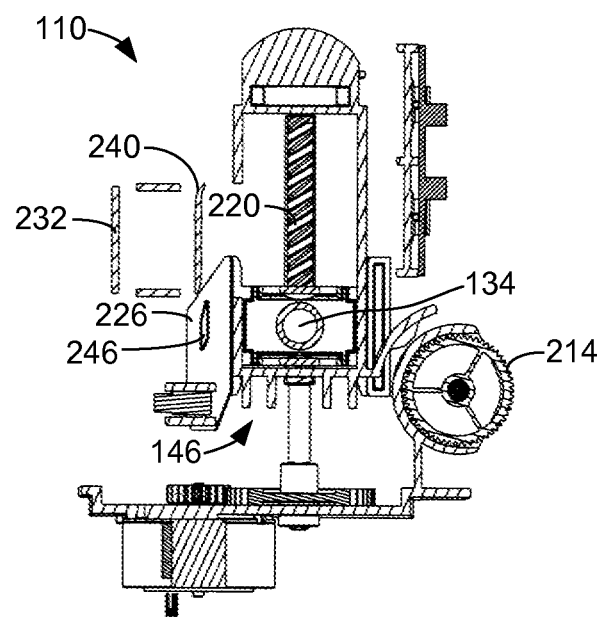

The substrate support 130 is positioned in alignment with the processing path 114, as shown in FIGS. 5 and 8A-C, to receive a card substrate (not shown) from the card processor 106. The controller 142 of the substrate rotator 110 can then execute a rotating operation by driving the motor 154 of the lift mechanism 132 to rotate the lead screw 220 and raise the bracket 226 and the attached substrate support 130 above the processing path 114, as shown in FIG. 9A. During this lifting operation of the substrate support 130, the rack gear 232 is placed in the withdrawn position 236, as illustrated in FIG. 9A-C. As shown in FIG. 9, the withdrawn position 236 of the rack gear 232 causes the gear teeth 234 to be disengaged from the gear teeth of the rotator gear 230. This allows the substrate support 130 to raised without rotating the substrate support 130 about the axis 134. The rack gear 232 can then be moved to the engaging position 238, shown in FIG. 11A causing the gear teeth 234 of the rack gear 232 to intermesh with the gear teeth of the rotator gear 230 as the substrate support is moved along the vertical plane 238 by the lift mechanism 132. This causes the substrate support 130 to rotate about the axis 134 in the direction indicated by arrow 250, as shown in FIGS. 11A and 11B. The gear teeth 234 and the rotator gear 230 are designed to produce a 180 degree rotation of the substrate support during their engagement. The substrate support 130 is then flipped 180 degrees from its initial position (FIG. 8B) by the time it reaches the aligned position with the processing axis 114, as shown in FIG. 12B.

In one embodiment, the rack gear 232 is directed to the withdrawn position 236 and/or the engaging position 238 through contact with a portion of the bracket 226. In one embodiment, the rack gear 232 includes a rail 240. In one embodiment, the rack gear 232 is biased toward the withdrawn position using a spring or other suitable biasing component. As the bracket 226 moves upward responsive to the rotation of the lead screw 220, the rack gear 232 can be maintained in the withdrawn position by the biasing component. Alternatively, a portion 246 of the bracket 226 can ride against an interior side 242 of the rail 240 to direct the rack gear 232 toward the withdrawn position 236. In one embodiment, the rack gear 232 is maintained in the withdrawn position 236 until the substrate rotator reaches the position 160A to avoid the intermeshing of the gear teeth 234 and the rotator gear 230, shown in FIGS. 3 and 10A-C.

Figure 10C:
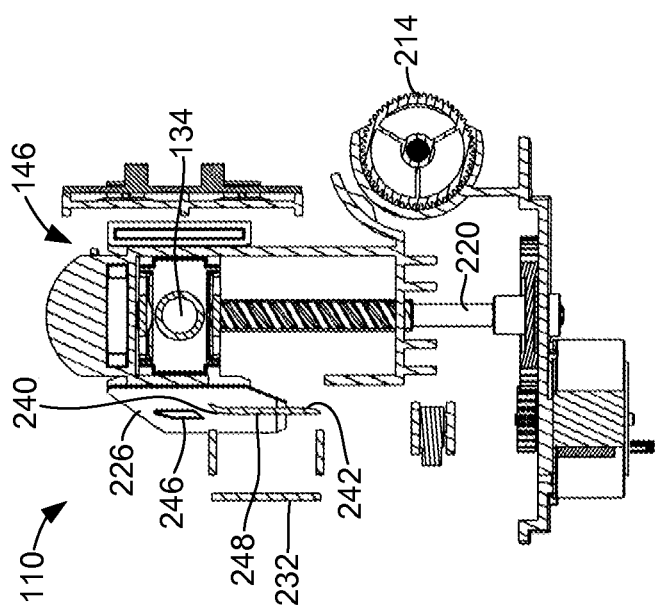

In one embodiment, as the substrate support 130 begins its return toward the processing path 114 from the position 160A using the lift mechanism 132, the portion reaches the position 160A, the portion 246 of the bracket 226 engages an exterior side 248 of the rail 240, as shown in FIG. 10C. As the substrate support 130 continues toward the processing path 114, the portion 246 of the bracket 226 rides on the exterior side 248 of the rail 240 and directs the rack gear 232 to the engaging position 248, as shown in FIGS. 11A and 11C. Thus, the gear teeth 234 of the rack gear 232 are positioned to engage the rotator gear 230, as shown in FIG. 11A. As discussed above, the movement of the substrate support 130 along the vertical plane 138 causes the rotator gear 230 to rotate responsive to the intermeshing with the gear teeth 234 of the rack gear 232, which rotates the substrate support 130 about the axis 134 in the direction indicated by arrow 250, as shown in FIGS. 11A and 11B.

In one alternative embodiment, the rack gear 232 is biased toward the engaging position 238 and the rail 240 and the portion 246 are designed to deflect the rack gear 232 toward the withdrawn position 236 during either the raising or lowering of the substrate support 130 by the lift mechanism 132.

While the rail 240 is illustrated as being a portion of the rack gear 232 and the portion 246 is attached to the bracket 226, it is understood that many other designs are possible that can provide the desired function of directing the rack gear 232 either toward the rotator gear 230 (engaging position) to cause the gear teeth 234 to intermesh with the gear teeth of the rotator gear 230 and cause a rotation of the substrate support 130, or direct the rack gear 232 away from the rotator gear 230 (withdrawn position) to prevent the intermeshing of the gear teeth 234 with the gear teeth of the rotator gear 230 and prevent the rotation of the substrate support 130.

Although the present invention has been described with reference to preferred embodiments, workers skilled in the art will recognize that changes may be made in form and detail without departing from the spirit and scope of the invention.

What is claimed is:

1. A card substrate rotator for use in a credential processing device comprising:
    a substrate support configured to receive a card substrate, the substrate support comprising a feed roller driven by a gear;
    a rotator mechanism configured to rotate the substrate support about a horizontal axis; and
    a lift mechanism configured to move the substrate support and the axis in a vertical plane.

2. The substrate rotator of claim 1, wherein the rotator mechanism rotates the substrate support responsive to movement of the substrate support in the vertical plane.

3. The substrate rotator of claim 1, wherein the rotator mechanism comprises:
    a rotator gear coupled to the substrate support, the rotator gear configured to rotate about the axis with the substrate support; and
    a rack gear comprising gear teeth, wherein the rack gear is movable between a first position, in which the gear teeth of the rack gear engage the rotator gear, and a second position, in which the gear teeth of the rack gear are disengaged from the rotator gear.

4. The substrate rotator of claim 3, wherein the rotator mechanism rotates the substrate support responsive to movement of the substrate support in the vertical plane when the rack gear is in the first position.

5. The substrate rotator of claim 3, wherein:
    the lift mechanism further comprises a bracket attached to the substrate support;
    the rack gear contacts a portion of the bracket during movement of the substrate support in the vertical plan; and
    the rack gear is directed toward one of the first and second positions responsive to said contact between the rack gear and the bracket.

6. The substrate rotator of claim 5, wherein the rack gear comprises a rail and the bracket comprises a member that rides against the rail during movement of the substrate support in the vertical plane, the contact between the member and the rail directs the rack gear toward one of the first and second positions.

7. The substrate rotator of claim 1 further comprising a first portal at which card substrates are received by, or discharged from, a substrate support in a horizontal orientation, which is transverse to the vertical plane.

8. The substrate rotator of claim 7, wherein:
    the substrate rotator comprises a second portal that is displaced from the first portal in a vertical direction that is substantially parallel to the vertical plane; and
    the substrate support is configured to discharge card substrates through, or receive card substrates from, the second portal.

9. The substrate rotator of claim 1, wherein the lift mechanism comprises:
    a lead screw;
    a bracket attached to the lead screw and the substrate support, the bracket configured to move in the vertical plane responsive to rotation of the lead screw; and
    a motor configured to drive rotation of the lead screw.

10. A card substrate processing device comprising:
    a first substrate processing component;
    a first processing path in line with the first substrate processing component and a first portal;

a second substrate processing component;

a second processing path in line with the second substrate processing component and a second portal, wherein the second processing path is above the first processing path; and a card substrate rotator comprising:

a substrate support configured to receive a card substrate, the substrate support comprising a feed roller driven by a gear;

a rotator mechanism configured to rotate the substrate support about a horizontal axis; and a lift mechanism configured to move the substrate support and the axis in a vertical plane between a first position, in which the substrate support is aligned with the first portal and the first processing path, and a second position, in which the substrate support is aligned with the second portal and the second processing path;

wherein the feed roller is configured to feed a substrate through the first portal when the substrate support is in the first position, and the feed roller is configured to feed a substrate through the second portal when the substrate support is in the second position.

11. The device of claim 10, wherein the rotator mechanism rotates the substrate support responsive to movement of the substrate support in the vertical plane by the lift mechanism.

12. The device of claim 11, wherein the first and second substrate processing components are selected from the group consisting of a print head, a laminating roller and a data reader and writer.

13. The device of claim 12, further comprising a card hopper beneath the substrate support, wherein cards fed through the first portal fall into the card hopper when the substrate support is displaced from the first position.

14. A method comprising:

providing a substrate processing device comprising:

a first substrate processing component; and a first processing path in line with the first substrate processing component and a first portal; and a card substrate rotator comprising:

a substrate support configured to receive a card substrate, the substrate support comprising a feed roller driven by a gear;

a rotator mechanism configured to rotate the substrate support about a horizontal axis; and a lift mechanism configured to move the substrate support and the axis in a vertical plane;

processing a card substrate using the first substrate processing component;

feeding the card substrate along the first processing path, through the first portal and into the substrate support using the feed roller; and moving the substrate support, the card substrate and the axis away from the first processing path in a direction that is transverse to the first processing path using the lift mechanism.

15. The method of claim 14, further comprising:

rotating the substrate support and the card substrate about the axis using the rotator mechanism;

aligning the substrate support with the first portal; and feeding the card substrate through the first portal using the feed roller.

16. The method of claim 15, further comprising:

raising the substrate support above the first processing path; and discharging the card substrate through the first portal and into a card hopper positioned below the substrate support.

17. The method of claim 14, wherein:

the substrate processing device further comprises:

a second substrate processing component; and a second processing path in line with the second substrate processing component and a second portal;

moving the substrate support, the card substrate and the axis away from the first processing path comprises moving the substrate support, the card substrate and the axis in alignment with the second processing path using the lift mechanism; and the method further comprising:

feeding the card substrate through the second portal and along the second processing path using the feed roller; and processing the card substrate using the second processing component.

18. The method of claim 17, further comprising:

feeding the card substrate through the second portal and into the substrate support using the feed roller;

moving the substrate support, the card substrate and the axis toward the first processing path using the lift mechanism; and rotating the card substrate about the axis using the rotator mechanism.

19. The method of claim 18, wherein rotating the card substrate about the axis occurs responsive to moving the substrate support, the card substrate and the axis toward the first processing path using the lift mechanism.

20. The method of claim 14, wherein processing a card substrate comprises performing at least one process on the card substrate selected from the group consisting of printing an image on a surface of the substrate, laminating a surface of the substrate, reading data from the substrate, and writing data to the substrate.

* * * * *

UNITED STATES PATENT AND TRADEMARK OFFICE
CERTIFICATE OF CORRECTION

PATENT NO.       : 8,646,770 B2  
APPLICATION NO.  : 13/496406  
DATED            : February 11, 2014  
INVENTOR(S)      : James R. Meier et al.

Page 1 of 1

It is certified that error appears in the above-identified patent and that said Letters Patent is hereby corrected as shown below:

In the Claims

Column 10, line 34, delete "plan", insert --plane--.

Signed and Sealed this
Twelfth Day of July, 2016

Michelle K. Lee
*Director of the United States Patent and Trademark Office*